July 17, 1956 — H. J. BUTLER — 2,754,936
VEHICLE BRAKE
Filed Oct. 26, 1953 — 3 Sheets-Sheet 1

INVENTOR
Henry James Butler
by Benj. T. Rauber
his attorney

July 17, 1956  H. J. BUTLER  2,754,936
VEHICLE BRAKE

Filed Oct. 26, 1953  3 Sheets-Sheet 2

INVENTOR
Henry James Butler
by Benj. T. Rauber
his attorney

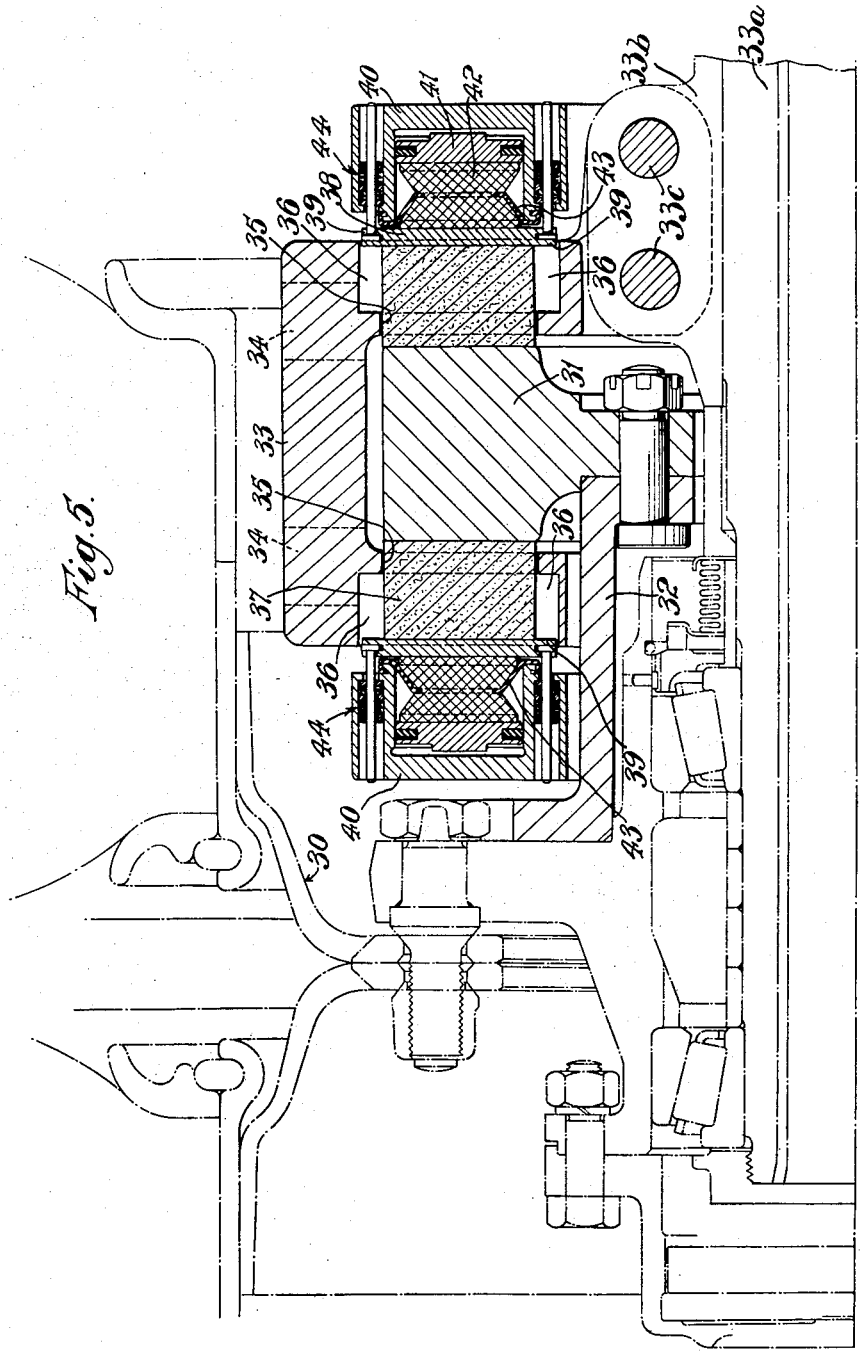

United States Patent Office 2,754,936
Patented July 17, 1956

2,754,936

VEHICLE BRAKE

Henry James Butler, Sutton Coldfield, England, assignor to Dunlop Rubber Company Limited, London County, England, a British company Application October 26, 1953, Serial No. 388,211

Claims priority, application Great Britain November 11, 1952

8 Claims. (Cl. 188—73)

This invention relates to disc brakes for vehicles, and more particularly to disc brakes for motor vehicles and the like.

In our British Patent No. 688,382 a disc brake assembly for motor vehicles and the like is described comprising an annular rotatable brake disc, a non-rotatable housing straddling a periphery of the disc and covering a portion only of the braking surfaces thereof and provided with a pair of co-axial cylinders, one on each side of the disc, each cylinder being connected to a source of fluid pressure, a plunger fluid-tightly slidable in each cylinder and a pad of friction material interposed between each plunger and the adjacent face of the disc, whereby frictional engagement is effected between the disc and pads when the cylinders are pressurised. The brake is described as having the cylinders formed integrally with the housing and two or more cylinders may be provided on each side of the disc.

The rapid generation of large quantities of heat which occurs under present day conditions, particularly in the braking of aircraft and high-powered motor vehicles, tends to cause trouble not only by brake fade, resulting from over-heating of the friction pads, but also from deterioration of seals and from heating of the hydraulic fluid usually employed for brake operation.

The object of the present invention is to provide a disc brake, preferably for motor vehicles and the like, which is an improvement on known brakes, particularly in respect of avoidance of the difficulties referred to in the preceding paragraph.

According to the invention a disc brake assembly comprises an annular rotatable brake disc, a non-rotatable caliper straddling a periphery of the disc and covering a portion only of the braking surfaces thereof, a pair of co-axial cylinders one on each side of the disc detachably secured to said caliper and spaced a short distance therefrom, friction pads slidable through holes in said caliper to frictionally contact said disc, means for supplying pressure fluid to the cylinders and a plunger fluid-tightly slidable in each of said cylinders to force said pads into frictional engagement with said disc.

Preferably the cylinders are formed in a cylinder block, and said blocks are secured to the caliper through spacing members, thereby substantially isolating the cylinder block from the parts of the brake which are liable to heat up during a braking operation. The cylinder blocks can also be easily removed for maintenance purposes or to replace the friction pads. Preferably also a distance piece, which may be made of an insulating material, is inserted between the plungers and the friction pads, to reduce still further transmission of heat to the plunger seals and hydraulic liquid. A flexible annular shield is preferably fitted between the distance piece, or a member associated therewith, and the open end of the cylinder to prevent the entry of foreign matter, moisture and the like.

In order that the invention may be more fully described, reference is made to the accompanying drawings, of which:

Figure 5 is a part sectional view through a double-wheel and disc brake assembly for a heavy vehicle.

Figure 1:
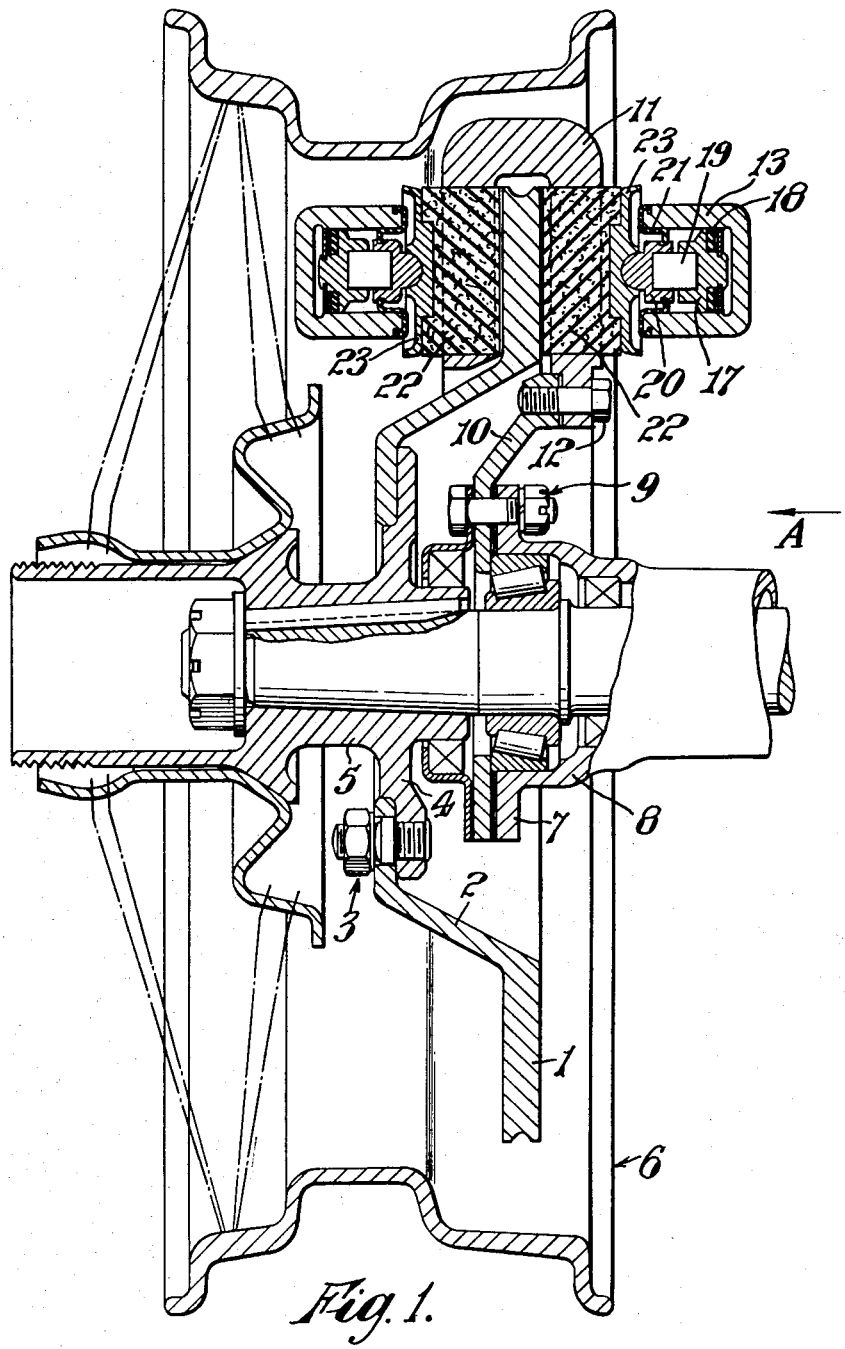
Figure 1 shows a section through a disc brake and wheel assembly for a motor-vehicle.
Figure 2:
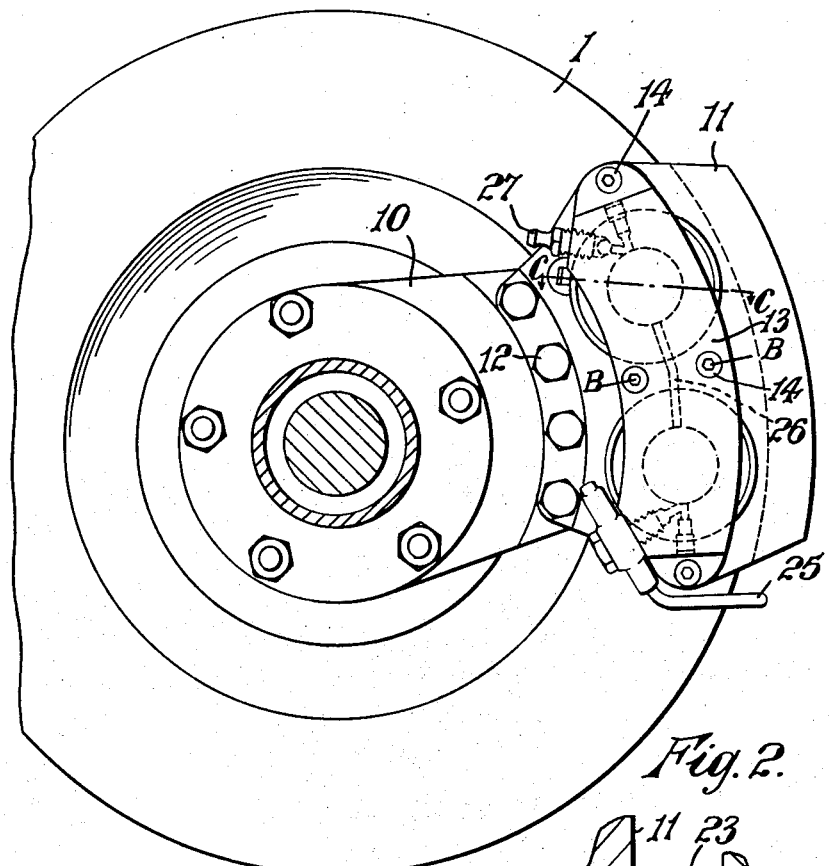
Figure 2 is a view of the disc brake assembly of Figure 1, excluding the wheel and looking in the direction of arrow "A."
Figures 3, 4:
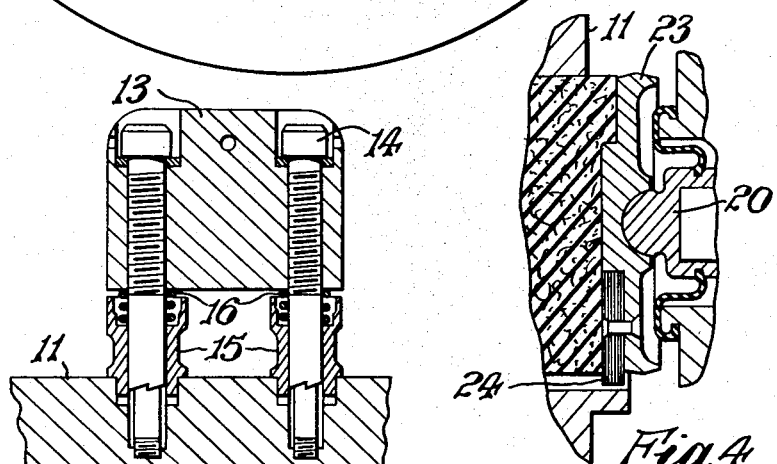
Figure 3 is a section through B—B of Figure 2.
Figure 4 is a section through C—C of Figure 2.

In the embodiment of the invention illustrated in Figures 1 to 4 the brake comprises an annular disc 1 provided at its inner periphery with a dished annular flange 2 which is secured at its inner periphery by nut and bolt assemblies 3 to an annular flange 4 extending outwardly from the rotatable hub 5 of a vehicle wheel 6.

An annular flange 7 extends outwardly from a non-rotatable axle casing 8 and secured thereto by nut and bolt assemblies 9 is a torque plate 10 which extends radially to a location adjacent the inner periphery of said disc. A caliper 11 of substantially U-section straddles the outer periphery of the disc and covers a minor portion of the braking surfaces thereof, said caliper being secured at one of its inner edges to the outer edge of the torque plate by bolts 12. Each limb of the caliper is provided with a pair of holes extending axially therethrough, said holes being axially aligned with the braking surfaces of the disc, and each hole is axially aligned with a corresponding hole on the other side of the disc.

A cylinder block 13 is secured to each limb of the caliper, on the side thereof remote from the disc, by bolts 14 (Figure 3), which extend through clearance holes in said block and through spacing members 15 and have their ends secured to the caliper. A gap is thus provided between the adjacent faces of the block and the limb of the caliper. A spring 16 is provided between each spacing member 15 and the adjacent side of the block to maintain a small clearance therebetween, and thus allow for a differential in expansion when the parts are heated by operation of the brake.

Each cylinder block contains two cylinders, the open ends thereof being presented towards the limbs of the caliper and each cylinder is axially in line with an associated hole through one of said limbs. A plunger 17 is provided with a sealing ring 18 and is fluid-tightly slidable in each cylinder. The inoperative face of the plunger is recessed to accommodate one end of a cylindrical distance piece 19, the other end of which is accommodated in a recess in a pivoting member 20, the side of which remote from said recess is provided with a part-spherical projection. An annular rubber shield 21 has the inner periphery thereof clipped into a recess in the outer periphery of said pivoting member and the outer periphery thereof clipped into a recess adjacent the open end of the associated cylinder.

A cylindrical pad of friction material 22 is axially slidable in each hole in the limbs of the caliper, one end face being adapted to frictionally engage the adjacent braking face of the disc and the other end face being centrally recessed to accommodate a boss projecting centrally from one side of a circular backing plate 23 which abuts said face and is substantially of the same diameter as said pad. The other side of the backing plate is provided centrally with a part-spherical recess to accommodate the part-spherical projection on the pivoting member 20. The boss of the backing plate is a tight fit in the recess in the pad so that movement of the said plate, e. g. away from the disc, will draw the pad out of contact with said disc. A key 24 (Figure 4) is fitted in a radially-extending groove cut partly in the backing plate and partly in the adjacent face of the pad, and this key prevents the pad from rotating about its own axis.

A space is provided between each plunger and the base of its associated cylinder. Said spaced of two axially-aligned cylinders are connected to a source of pressure fluid through fluid connection 25, and said spaces of two adjacent cylinders are interconnected by conduits 26 extending through the cylinder block. The spaces of this pair of axially-aligned cylinders are connected to bleed-vents 27, whereby the hydraulic system may be bled.

The operation of the brake is as follows. Pressurization of the space between each plunger and the base of its cylinder as, for example, by operation of a master-cylinder or the like, forces said plunger towards the disc. The plunger carriers with it the distance piece and pivoting member, and the pivoting member, abutting the backing plate, moves the backing plate to force the associated friction pad into frictional engagement with the disc.

An advantage of this form of construction is that the cylinders, the plungers and the hydraulic liquid to operate the brakes are all substantially isolated from the heat generated on braking, since an air gap is provided between the cylinders and the caliper. The distance pieces, too, are interposed between the friction pads and the plungers, and these may be made of a heat-insulating material to reduce further the transmission of heat. The hydraulic liquid and the plunger seals are thus not greatly affected by the generation of heat on braking.

Another advantage is that the annular rubber shield between the end of the cylinder and the pivoting member keeps all foreign matter, moisture and the like from the bore of the cylinder. This keeps the cylinder bore clean, prevents rust and corrosion, and enables the plunger to make fluid-tight contact with the cylinder wall throughout its effective range of movement.

A further advantage of this construction is that maintenance of the brake is facilitated. For example, to renew the pads of friction material it is only necessary to detach the cylinder blocks, remove the remnants of the old pads from the backing plates, fit fresh pads and then replace the cylinder blocks. The friction pads of the present construction may be of considerable thickness, thus increasing the mileage between pad renewals.

If the friction pads and backing plates should tilt slightly due to uneven wear on the braking face, the pivoted connection between said plate and the pivoting member will ensure that the full braking force will still be applied over the braking face of the pad. Spring-loaded devices (not illustrated), may be fitted to retract the backing plates and hence the friction pads away from the disc when the braking pressure is removed, said devices incorporating a slipping friction device to compensate for wear of the pads.

Alternative means to prevent the cylindrical friction pads from rotating about their own axes may comprise a key fitted into an axially extending slot formed partly in the hole through the caliper and partly through the friction pad.

In another embodiment of the invention, illustrated in Figure 5, a disc brake is provided for a twin wheel assembly for a heavy commercial vehicle or the like. A sectional view of the part of the twin-wheel is shown diagrammatically at 30.

An annular disc 31 is secured at its inner periphery to one end of a substantially cylindrical member 32, the other end of which is secured to, and rotatable by, the vehicle wheel. A caliper 33, of substantially U-section, straddles the outer periphery of the disc and covers a minor portion only of the braking surfaces thereof and said caliper is secured to a non-rotatable part 33ᵃ of the wheel assembly by means of a ring clamp 33ᵇ secured to the non-rotatable part 33ᵃ by bolts 33ᶜ. Said caliper may be provided, at the outer periphery thereof, with a plurality of radially-extending holes 34 which not only lighten the caliper but provide also for a more efficient dissipation of heat from the disc.

The two limbs of the caliper are each provided with an arcuate hole 35 extending axially therethrough, the hole in one limb being axially aligned with the hole in the other limb, and both holes are axially-aligned with the braking surfaces of the disc. Each of said holes is provided, on each of the curved opposite sides thereof, with two axially-extending part-cylindrical recesses 36 which extend from the side of the hole remote from the disc to a location about three-quarters of the distance through said limb.

Two arcuate pads of friction material 37 in side-by-side relationship are slidably fitted through each of said holes, one end face of each pad being adapted to frictionally engage a braking surface of said disc and the other end face abutting an arcuate backing plate 38 which is also axially slidable in said hole. Each backing plate is provided with four part-spherical lugs 39 to slidably engage in the part-cylindrical recesses 36 of the holes 35.

Two cylinder blocks 40 are provided, each having two cylinders formed therein, and each block is secured through spacing members (not illustrated), as in the previous embodiment of the invention, to a limb of the caliper on the side remote from the disc. A plunger 41 is fluid-tightly slidable in each cylinder and a space between said plunger and the base of the cylinder is connected to a source of fluid pressure.

A distance piece 42 is fitted in each cylinder, one end thereof abutting the plunger and the other end abutting one end of the backing plate. An annular rubber shield 43 has its inner periphery clipped in a groove in the distance piece and its outer periphery clipped in a groove adjacent the open end of the cylinder.

Two spring-loaded devices 44, of the type are associated with each cylinder, the hands of the pins being secured to the lugs of the backing plate. The springs serve to retract the backing plate after operation of the brake and a slipping friction device allows the plate to move towards the disc to compensate for wear of the friction pads.

The operation of this brake is similar to that previously described. On pressurising the space between the plunger and the base of each cylinder the plungers are moved towards the disc and, acting through the distance pieces and backing plate force the friction pads in frictional engagement against the braking surfaces of the disc. This decelerates the disc and hence the wheel. On release of braking pressure the spring retraction device retracts the backing plates to allow the pads to move away from the disc and if wear of the pads occurs the slipping friction device automatically compensates for said wear.

As the friction pads wear during use the backing plates move closer in towards the disc until the lugs 39 thereon strike the ends of the part-cylindrical recesses 36. This indicates to the operator that the friction pads require renewal.

Disc brakes of the type herein described are not limited to vehicle wheels but may be used as transmission brakes for vehicles or machinery and the like.

Having described my invention what I claim is:

1. A disc brake assembly comprising an annular rotatable brake disc, a non-rotatable caliper straddling a periphery of the disc and covering a portion only of the path of rotation of the braking surfaces thereof, a pair of co-axial cylinders one on each side of the disc detachably secured to said caliper, friction pads slidable through holes in said caliper to frictionally contact said disc, means for supplying pressure fluid to the cylinders, a plunger fluid-tightly slidable in each of said cylinders to force said pads into frictional engagement with said disc, and spacing members at spaced intervals between said cylinders and said caliper to provide an air space therebetween and between each of said plungers and associated friction pads to provide an air space therebetween to prevent the transmission of heat to said cylinders and plungers from said brake disc.

2. A disc brake assembly according to claim 1 wherein the said spacing members are former of a nonheat-conductive material.

3. A disc brake assembly according to claim 2 wherein a spring is interposed between said cylinders and the adjacent end of their associated spacing members to provide a clearance therebetween to allow for differential expansion of the parts.

4. A disc brake assembly according to claim 3 wherein each friction pad is provided, on the side remote from the disc, with a backing plate which is also slidable in the hole through the caliper.

5. A disc brake assembly according to claim 4 wherein a pivoting member is interposed between said backing plate and the associated spacing member, said pivoting member having a pivotal connection with said backing plate.

6. A disc brake assembly according to claim 1 wherein one end of each cylinder is open and is provided with an annular flexible shield to prevent the entry of dirt, moisture and the like into the cylinder.

7. A disc brake assembly according to claim 1 wherein means are provided to prevent movement of said backing plate through said hole beyond a predetermined distance.

8. A disc brake assembly according to claim 1 wherein the friction pads are cylindrical and are prevented from rotating about their own axis by a key or like means.

References Cited in the file of this patent

UNITED STATES PATENTS

| | | |
|---|---|---|
| 2,304,774 | Ash | Dec. 15, 1942 |
| 2,466,990 | Johnson et al. | Apr. 12, 1949 |
| 2,531,341 | Meador | Nov. 21, 1950 |
| 2,614,662 | Hawley | Oct. 21, 1952 |
| 2,657,772 | Chamberlain | Nov. 3, 1953 |